US011074870B2

(12) United States Patent
Lee et al.

(10) Patent No.: US 11,074,870 B2
(45) Date of Patent: Jul. 27, 2021

(54) DISPLAY APPARATUS AND CONTROL METHOD THEREOF

(71) Applicant: SAMSUNG ELECTRONICS CO., LTD., Suwon-si (KR)

(72) Inventors: Gyuheon Lee, Suwon-si (KR); Jungmin Ku, Suwon-si (KR); Jihyeok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/861,609

(22) Filed: Apr. 29, 2020

(65) Prior Publication Data

US 2020/0372864 A1    Nov. 26, 2020

(30) Foreign Application Priority Data

May 23, 2019    (KR) .................. 10-2019-0060770

(51) Int. Cl.
*G09G 3/34*    (2006.01)
(52) U.S. Cl.
CPC ..... *G09G 3/3406* (2013.01); *G09G 2320/064* (2013.01); *G09G 2320/0666* (2013.01); *G09G 2354/00* (2013.01); *G09G 2360/144* (2013.01)
(58) Field of Classification Search
None
See application file for complete search history.

(56) References Cited

U.S. PATENT DOCUMENTS

| | | | | |
|---|---|---|---|---|
| 2006/0256067 | A1* | 11/2006 | Montero | G09G 3/3406 345/102 |
| 2014/0002428 | A1* | 1/2014 | Letourneur | G09G 3/34 345/207 |
| 2014/0285477 | A1 | 9/2014 | Cho et al. | |
| 2017/0221450 | A1 | 8/2017 | Kim et al. | |
| 2017/0353689 | A1 | 12/2017 | Choe et al. | |
| 2018/0190240 | A1 | 7/2018 | Ropo et al. | |

OTHER PUBLICATIONS

Extended European Search Report dated Oct. 20, 2020 in European Patent Application No. 20175035.3.

* cited by examiner

*Primary Examiner* — Aneeta Yodichkas
(74) *Attorney, Agent, or Firm* — Staas & Halsey LLP

(57) ABSTRACT

Disclosed is a display apparatus which selects one output setting level among the plurality of output setting levels based on the received user input, selects one ambient characteristic level among the plurality of ambient characteristic levels based on the detected ambient characteristic, selects an output setting value corresponding to the selected output setting level and the selected ambient characteristic level among the plurality of output setting values, and controls the display to cause the light source to output light based on the selected output setting value.

20 Claims, 12 Drawing Sheets

FIG. 4

| AMBIENT CHARACTERISTIC LEVELS (E) / OUTPUT SETTING LEVELS (B) | e1 | e2 | ••• | e8 | e9 |
|---|---|---|---|---|---|
| b1 | 1 | 2 | ••• | 8 | 10 |
| b2 | 5 | 7 | ••• | 18 | 20 |
| ⋮ | ⋮ | ⋮ | ⋱ | ⋮ | ⋮ |
| b8 | 40 | 56 | ••• | 83 | 85 |
| b9 | 45 | 63 | ••• | 88 | 90 |

OUTPUT SETTING VALUE (P)

FIG. 7

| AMBIENT CHARACTERISTIC LEVELS (E) / OUTPUT SETTING LEVELS (B) | e1 | e2 | ... | e8 | e9 |
|---|---|---|---|---|---|
| b1 | 1 | 2 | ... | 8 | 10 |
| b2 | 5 | 7 | ... | 18 | 20 |
| ⋮ | ⋮ | ⋮ | ⋱ | ⋮ | ⋮ |
| b8 | 40 | 56 | ... | (83) | 85 |
| b9 | 45 | 63 | ... | 88 | 90 |

OUTPUT SETTING VALUE (P)

| SECOND AMBIENT CHARACTERISTIC LEVELS (E) / SECOND OUTPUT SETTING LEVEL (C) | w1 | w2 | ... | w8 | w9 |
|---|---|---|---|---|---|
| c1 | 1 | 3 | ... | 7 | 9 |
| c2 | 6 | 8 | ... | 17 | 19 |
| ⋮ | ⋮ | ⋮ | ⋱ | ⋮ | ⋮ |
| c8 | 42 | 58 | ... | 77 | (79) |
| c9 | 47 | 65 | ... | 87 | 89 |

SECOND OUTPUT SETTING VALUE (Q)

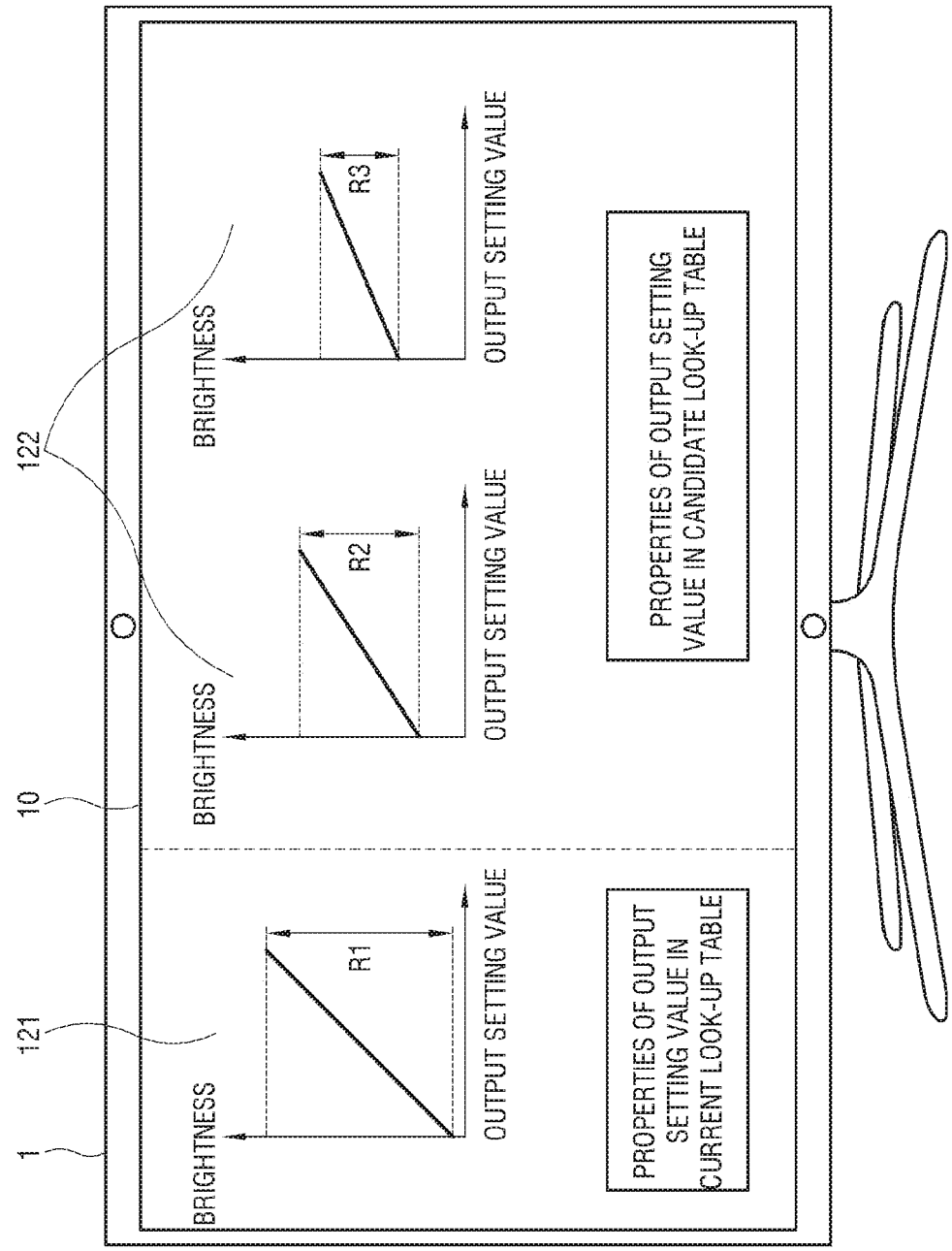

DISPLAY APPARATUS AND CONTROL METHOD THEREOF

CROSS-REFERENCE TO RELATED APPLICATIONS

This application is based on and claims priority under 35 U.S.C. § 119 to Korean Patent Application No. 10-2019-0060770 filed on May 23, 2019 in the Korean Intellectual Property Office, the disclosure of which is incorporated by reference herein in its entirety.

BACKGROUND

1. Field

The disclosure relates to a display apparatus, which outputs light to display an image, and a control method thereof, and more particularly to a display apparatus, which displays an image with brightness based on a user input and the ambient characteristic, and a control method thereof.

2. Description of the Related Art

With continuous technical development of a display apparatus, a recent display apparatus has various functions for setting up optimum viewing environments as well as a simple function for displaying an image. For example, when a user turns up the brightness of an image, the display apparatus may adjust the brightness of the image considering illuminance such as surrounding illumination, sunlight, etc. (hereinafter, referred to as 'ambient characteristics').

A detailed example of taking the surrounding illumination into account to adjust the brightness of the image is as follows. The display apparatus detects the brightness of the surrounding illumination, and performs an operation with regard to input brightness data of a user and detected brightness data of the illumination, thereby calculating a brightness adjustment value. Further, the display apparatus may adjust and output the brightness of an image based on the calculated brightness adjustment value. Thus, the brightness is adjusted by considering the ambient characteristic with respect to a use input for adjusting the brightness of the image, thereby providing an image optimized for current viewing environments.

SUMMARY

An aspect of one or more exemplary embodiments is to provide a display apparatus and a control method thereof, in which a burden of resources is eased when the brightness of an image is adjusted considering an ambient characteristic, thereby not only preventing a delay of a brightness adjusting time and degradation of brightness adjusting performance, but also reducing power consumption.

According to an exemplary embodiment, there is provided a display apparatus comprising: a display comprising a light source to output light, and configured to display an image based on the output light; a storage configured to store a look-up table in which a plurality of output setting levels for the light source, and a plurality of output setting values for the light source provided to output the light with brightness corresponding to a plurality of ambient characteristic levels of the display apparatus are tabulated; an input receiving circuit configured to receive a user input; a sensor configured to detect an ambient characteristic of the display apparatus; and a processor configured to: select one output setting level among the plurality of output setting levels based on the received user input, select one ambient characteristic level among the plurality of ambient characteristic levels based on the detected ambient characteristic, select an output setting value corresponding to the selected output setting level and the selected ambient characteristic level among the plurality of output setting values, and control the display to cause the light source to output light based on the selected output setting value.

The ambient characteristic comprises at least one of brightness or color temperature around the display apparatus.

The display further comprises a driving circuit configured to drive the light source based on a pulse width modulation (PWM) control signal, and the output setting value comprises a setting value of the PWM control signal.

The storage is configured to store a second look-up table in which a plurality of second output setting levels based on the output setting value of the look-up table, and a plurality of second output setting values provided corresponding to a plurality of second ambient characteristic levels of the display apparatus are tabulated, and the processor is configured to: select one second output setting level among the plurality of second output setting levels based on the selected output setting value, select one second ambient characteristic level among the plurality of second ambient characteristic levels, select a second output setting value corresponding to the selected second output setting level and the selected second ambient characteristic level among the plurality of second output setting values, and control the display to display the image based on the selected second output setting value.

The storage is configured to store a second look-up table in which a plurality of second output setting levels based on the output setting value in the look-up table, and a plurality of second output setting values provided to correspond to a plurality of image-quality adjustment levels of the display apparatus are tabulated, and the processor is configured to: select one second output setting level among the plurality of second output setting levels based on the selected output setting value, select one image-quality adjustment level among the plurality of image-quality adjustment level based on a user input, select a second output setting value corresponding to the selected second output setting level and the selected image-quality adjustment level among the plurality of second output setting values, and control the display to display an image based on the selected second output setting value.

The second output setting value comprises one of a brightness setting value for the light source or a brightness setting value for an image signal.

The storage is configured to store the plurality of look-up tables which are different in the output setting value from each other with respect to the same output setting level and the same ambient characteristic level, the processor is configured to select one look-up table among the plurality of look-up tables, and select the output setting value in the selected look-up table.

The processor is configured to select one look-up table among the plurality of look-up tables based on the user input.

The processor controls the display to display guide information showing properties of output setting values in the plurality of look-up tables.

The plurality of output setting levels and the plurality of ambient characteristic levels are provided to have uniform gaps between the plurality of neighboring output setting values.

Levels of at least some sections of the plurality of output setting levels and the plurality of ambient characteristic levels are provided to have non-uniform gaps between the plurality of neighboring output setting values.

The processor changes at least one output setting value among the plurality of output setting values in the look-up table based on the user input, and stores the changed output setting value in the storage.

The processor adjusts at least one of a minimum value or a maximum value of the output setting level based on the user input, and changes the plurality of output setting values based on the minimum value or the maximum value of the adjusted output setting level.

The processor controls the display to display second guide information showing properties of output setting values in the plurality of look-up tables which are different in the minimum value or the maximum value of the output setting level from each other.

According to another exemplary embodiment, there is provided a method of controlling a display apparatus comprising a display comprising a light source to output light and configured to display an image based on the output light, the method comprising: selecting one output setting level based on a user input among a plurality of output setting levels for the light source, with reference to a look-up table in which the plurality of output setting levels for the light source, and a plurality of output setting values for the light source provided to output the light with brightness corresponding to a plurality of ambient characteristic levels of the display apparatus are tabulated; selecting one ambient characteristic level among the plurality of ambient characteristic of the display apparatus levels based on the ambient characteristic of the display apparatus; selecting an output setting value corresponding to the selected output setting level and the selected ambient characteristic level among the plurality of output setting values for the light source; and controlling the display to cause the light source to output light based on the selected output setting value.

The ambient characteristic comprises at least one of brightness or color temperature around the display apparatus.

The output setting value comprises a setting value for a pulse width modulation (PWM) control signal, and the controlling comprises driving the light source based on the PWM control signal.

Further comprising: selecting one second output setting level among a plurality of second output setting levels based on the selected output setting value, with reference to a second look-up table in which the plurality of second output setting levels based on the output setting value of the look-up table, and a plurality of second output setting values provided corresponding to a plurality of second ambient characteristic levels of the display apparatus are tabulated; selecting one second ambient characteristic level among the plurality of second ambient characteristic levels; selecting a second output setting value corresponding to the selected second output setting level and the selected second ambient characteristic level among the plurality of second output setting values; and controlling the display to display the image based on the selected second output setting value.

Further comprising: selecting one second output setting level among the plurality of second output setting levels based on the selected output setting value, with reference to a second look-up table in which a plurality of second output setting levels based on the output setting value in the look-up table, and a plurality of second output setting values provided to correspond to a plurality of image-quality adjustment levels of the display apparatus are tabulated; selecting one image-quality adjustment level among the plurality of image-quality adjustment level based on a user input; selecting a second output setting value corresponding to the selected second output setting level and the selected image-quality adjustment level among the plurality of second output setting values; and controlling the display to display an image based on the selected second output setting value.

According to another exemplary embodiment, there is provided a recording medium stored with a computer program comprising a code for performing a method of controlling a display apparatus comprising a display comprising a light source to output light and configured to display an image based on the output light, as a computer readable code, the method comprising: selecting one output setting level based on a user input among a plurality of output setting levels for the light source, with reference to a look-up table in which the plurality of output setting levels for the light source, and a plurality of output setting values for the light source provided to output the light with brightness corresponding to a plurality of ambient characteristic levels of the display apparatus are tabulated; selecting one ambient characteristic level among the plurality of ambient characteristic of the display apparatus levels based on the ambient characteristic of the display apparatus; selecting an output setting value corresponding to the selected output setting level and the selected ambient characteristic level among the plurality of output setting values for the light source; and controlling the display to cause the light source to output light based on the selected output setting value.

BRIEF DESCRIPTION OF THE DRAWINGS

The above and/or the aspects will become apparent and more readily appreciated from the following description of exemplary embodiments, taken in conjunction with the accompanying drawings, in which:

FIG. 4 illustrates a look-up table in which a plurality of output setting values in FIG. 3 are tabulated;

FIG. 7 illustrates that a second output setting value of a second look-up table is selected based on an output setting value selected in the look-up table in connection with operation S34 in FIG. 3;

FIG. 12 illustrates an example of displaying second guide information that shows properties of output setting values of the plurality of look-up tables different in the minimum value or maximum value of the output setting level from each other.

DETAILED DESCRIPTION

Figure 1:
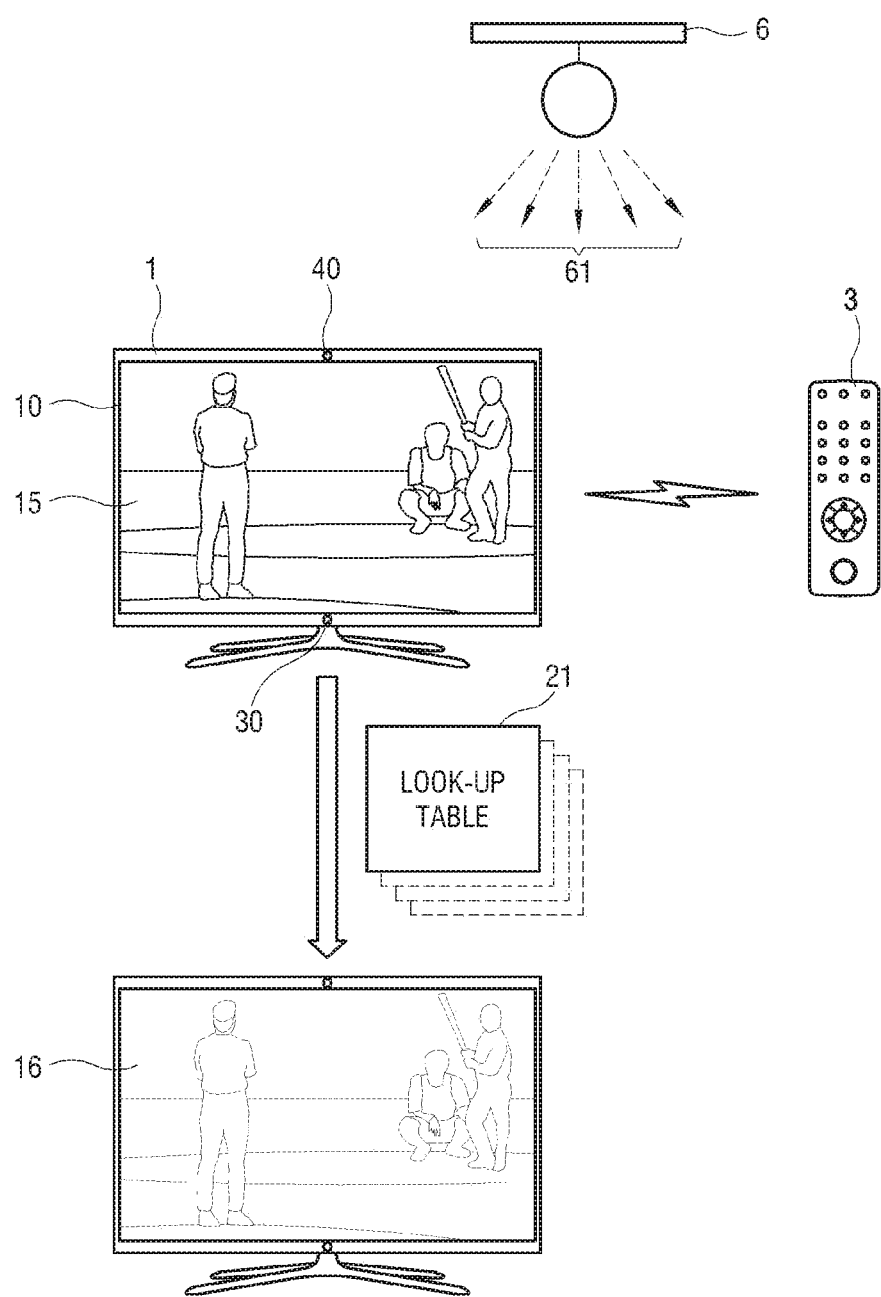
FIG. 1 illustrates a display apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same operations. In the disclosure, at least one among a plurality of elements refers to not only all the plurality of elements but also both each one of the plurality of elements excluding the other elements and a combination thereof.

FIG. 1 illustrates a display apparatus 1 according to an embodiment of the disclosure. As shown in FIG. 1, the display apparatus 1 according to this embodiment may display an image. FIG. 1 shows that the display apparatus 1 is a television (TV), but the display apparatus 1 is not limited to the TV. Alternatively, the display apparatus 1 may be embodied by a smartphone, a tablet computer, a personal computer, a wearable device such as a smart watch, a multimedia player, an electronic frame, home appliances such as a refrigerator, or the like capable of displaying an image. However, for convenience of description, descriptions will be made on the assumption that the display apparatus 1 is the TV.

The display apparatus 1 may include a display 10 configured to display an image 15. For example, the image 15 may be displayed with predetermined brightness based on light emitted from a light source of the display 10.

The display apparatus 1 may receive a user input for changing the brightness of the image 15 displayed on the display 10. For example, the user input may be received through a remote controller 3, and the display apparatus 1 may receive a remote-control signal corresponding to the user input from the remote controller 3 through an input receiving circuit 30. In this case, the input receiving circuit 30 may include a remote-control signal module 31. However, a user input is not limited to the user input received through the remote controller 3, but may be received through an external device such as a smartphone, a wearable device, etc. Hereinafter, for convenience of description, the descriptions will be made on the assumption that a user input is received through the remote controller 3.

The display apparatus 1 may detect ambient characteristics. The ambient characteristics may include the brightness, illuminance, ambient color temperature, etc. of an illumination, sunlight, and the like around the display apparatus 1. The ambient characteristic may be detected by a sensor 40 provided inside the display apparatus 1, but there are no limits to the detection of the ambient characteristic. Alternatively, the ambient characteristic may be detected by an external sensor provided outside the display apparatus 1. In this case, the display apparatus 1 may further include an element configured to receive the ambient characteristic detected by the external sensor.

The display apparatus 1 may display an image with brightness based on the detected ambient characteristic. For example, it will be assumed that the display apparatus 1 is provided in a room together with an illumination 6, and displays the image 15 with predetermined brightness. When the illumination 6 emits light with an illuminance of '450 lux', the display apparatus 1 may display the image 15 with brightness corresponding to the illuminance of '450 lux' detected through the sensor 40. Further, when the illumination 6 emits light with an illuminance of '850 lux', the display apparatus 1 may display the image 15 with brightness corresponding to the illuminance of '850 lux' detected through the sensor 40. The brightness corresponding to the illuminance of '850 lux' may be designed to be higher than the brightness corresponding to the illuminance of '450 lux', or the brightness corresponding to the illuminance of '450 lux' may be designed to be higher than the brightness corresponding to the illuminance of '850 lux'.

When a user input is made to change the brightness of an image, the display apparatus 1 may display the image with brightness by taking the user input and the ambient characteristic into account. The brightness of the displayed image may be adjusted by changing an output setting level of a light source 11 or changing an image signal's own brightness level.

For example, it will be assumed that the display apparatus 1 is provided in a room together with the illumination 6 and displays the image 15 while the light source 11 has an output setting level of '40'. When a user input for changing the output setting level into '80' is received, and the sensor 40 detects an illumination 61 having an illuminance of '850 lux', the display apparatus 1 may emit light with an output setting level obtained by taking both the output setting level of '80' based on the user input and the illuminance of '850 lux' into account, and display an image 16 with the changed brightness. The brightness of the image 16, which is obtained by considering both the output setting level of '80' and the illuminance of '850 lux', may be designed to be higher, lower or equal to the brightness of the image based on the output setting level of '80', and may be nonlinear or discontinuous as compared with the brightness of the image based on the output setting level of '80'.

In particular, the display apparatus 1 according to this embodiment may display the image 16 with the brightness, obtained by considering both the user input and the ambient characteristic with reference to a look-up table 21. The look-up table 21 may include a plurality of output setting values tabulated to emit light with brightness obtained by taking both the user input and the ambient characteristic into account.

For example, it will be assumed that the display apparatus 1 displays the image 15 while the light source 11 has the output setting level of '40' under the condition that the illumination 61 has the illuminance of '850 lux'. In this case, when a user input is made to change the output setting level into '80', the display apparatus 1 may select an output setting value corresponding to the illuminance of '850 lux' among a plurality of output setting values matching the output setting level of '80' with reference to the look-up table 21, and display the image 16 by controlling the light source 11 to emit light with the brightness corresponding to the selected output setting value of '83'. Alternatively, the display apparatus 1 may be provided with a look-up table in which brightness setting values of an image signal are tabulated, select a brightness setting value corresponding to the illuminance of '850 lux' among the plurality of brightness setting values matching the output setting level of '80' with reference to the look-up table, and process the image signal based on the selected brightness setting value, thereby displaying the image 16. In this regard, details will be described with reference to FIG. 4 and the like.

Like this, the display apparatus 1 displays the image 16 with the brightness based on the user input and the ambient characteristic with reference to the look-up table 21, and thus a burden of resources in the display apparatus 1 is eased when the image 16 is displayed with the brightness optimized by performing operation between the user input and the ambient characteristic.

In particular, even though the amount of data related to the detection of the ambient characteristic is rapidly increased due to diversity, complexity, variability, irregularity, etc. of the ambient characteristic, the display apparatus 1 according to this embodiment not only prevents a time delay or performance degradation in adjustment into the optimum brightness but also reduces power consumption.

Figure 2:
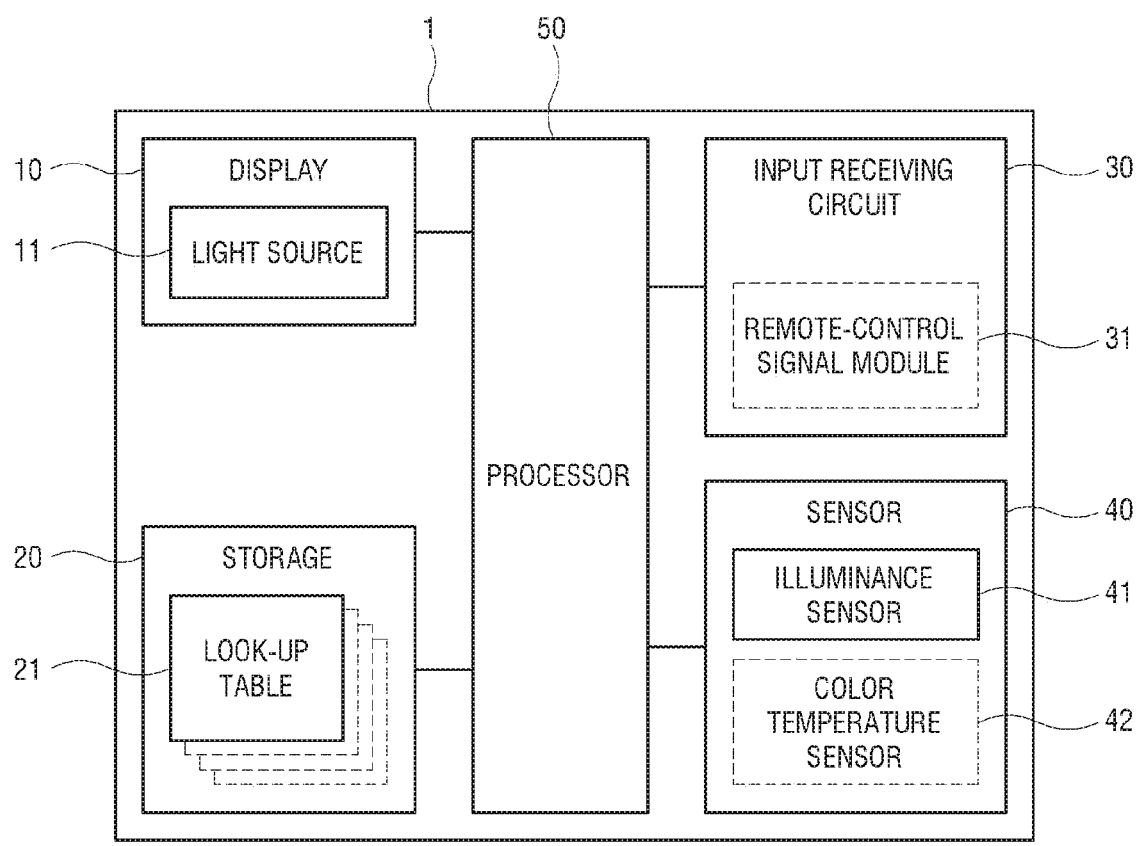
FIG. 2 is a block diagram of the display apparatus in FIG. 1.

FIG. 2 is a block diagram of the display apparatus in FIG. 1. As shown in FIG. 2, the display apparatus 1 according to this embodiment may include the display 10, a storage 20, the input receiving circuit 30, and the sensor 40.

The display 10 may display an image based on a processed image signal/data. For example, the display 10 may display a broadcast image based on a broadcast signal of a tuned channel. For example, there are various types of the display 10, such as liquid crystal, plasma, an organic light-emitting diode, a carbon nano-tube, nano-crystal, etc., and the display 10 is not limited to these types.

The display 10 may include the light source 11. The light source 11 may emit light with predetermined brightness according to supplied power. The light source 11 may be provided as a backlight unit, and the backlight unit may include a light-emitting diode (LED).

The storage 20 may be configured to store data for processing the elements of the display apparatus 1 and programs for controlling the elements. For example, the storage 20 may be configured to store the look-up table 21 in which user inputs and ambient characteristics are tabulated. The storage 20 may include a storage medium of at least one type among a flash memory type, a hard disk type, a multimedia card micro type, a card type memory, and a read only memory (ROM). Further, the storage 20 may be achieved by a web storage configured to store data and programs on the Internet.

The input receiving circuit 30 may receive a user input. A circuit related to the input receiving circuit 30 is a closed path that allows electricity to flow from one point to another. It may include various electrical components, such as transistors, resistors, and capacitors. According to user input modes, the input receiving circuit 30 may be achieved variously. For example, when a user input is received through the remote controller 3, the input receiving circuit 30 may include the remote-control signal module 31 capable of receiving a remote-control signal. The input receiving circuit 30 is not limited to the remote-control signal module 31, but may include elements for receiving a signal from a smartphone, a wearable device, etc. As necessary, the input receiving circuit 30 may include a menu button, a touch panel, etc. provided in the display apparatus 1.

Further, the input receiving circuit 30 may further include a communicator. The communicator may perform wired or wireless communication with an external apparatus based on various communication methods such as Bluetooth, ZigBee, W-Fi Direct (WFD), ultra-wideband (UWB), infrared Data Association (IrDA), Bluetooth low energy (BLE), near field communication (NFC), etc.

The sensor 40 may detect the ambient characteristic of the display apparatus 1. The ambient characteristic may include the brightness, illuminance, ambient color temperature, etc. of light, sunlight, etc. emitted from an illumination around the display apparatus 1, the sun, or the like external light source. Therefore, the sensor 40 may include an illuminance sensor for detecting ambient brightness, a color-temperature sensor for detecting ambient color temperature, etc. or may be provided as a single integrated sensor.

Further, the sensor 40 is provided at one side of the display apparatus 1, but there are no limits to the sensor 40 provided in the display apparatus 1. Alternatively, the sensor 40 may be achieved by an external sensor provided outside the display apparatus 1. In a case of the external sensor, the display apparatus 1 may further include an element configured to receive information about the ambient characteristic detected by the external sensor.

The processor 50 may control general elements of the display apparatus 1. For example, the processor 50 may select an output setting level based on a user input with reference to the look-up table 21, and select an ambient characteristic level based on the ambient characteristic of the display apparatus 1 detected by the sensor 40. Further, the processor 50 may select an output setting level based on a user input and an output setting value corresponding to an ambient characteristic level based on the detected ambient characteristic with reference to the look-up table 21, and control the display 10 so that the light source can emit light based on the selected output setting value.

The processor 50 may include a control program (or instruction) for performing control with regard to general elements, a nonvolatile memory in which the control program is installed, a volatile memory in which at least a part of the installed control program is loaded, and at least one processor or central processing unit (CPU) for executing a loaded control program. Further, such a control program may be stored in an electronic apparatus other than the display apparatus 1.

The control program may include a program(s) actualized in the form of at least one among a basis input/output system (BIOS), a device driver, an operating system, a firmware, a platform, and an application. According to an exemplary embodiment, the application may be previously installed or stored when the display apparatus 1 is manufactured, or may be installed based on application data received from the outside when it is used in the future. The application data may for example be downloaded from an application market and the like external server. Such a server is an example of a computer program product, but not limited to this example.

The display apparatus 1 may exclude at least one element from the foregoing configuration or may add another element to the foregoing configuration. For example, the display apparatus 1 may further include an image signal receiver, a signal processor, a power supply, etc.

The image signal receiver may receive a terrestrial image signal, a cable image signal, an Internet protocol (IP) image signal, etc. from an external terrestrial TV, a cable TV (CATV), an IP TV, and the like server. However, there are no limits to the image signal received in the image signal receiver. Alternatively, the image signal receiver may receive an image signal through a digital versatile disc (DVD), a smartphone, a tablet computer, or the like portable storage medium.

The signal processor performs video processing with regard to a video signal received in the image signal receiver under control of the processor 50, and controls the display 10 to display an image. There are no limits to the kinds of image processing, and the image processing may for example include tuning for the received image signal, decoding corresponding to the kind of image signal, scaling, noise reduction, detail enhancement, frame refresh rate conversion, etc. Further, the signal processor may perform audio processing with regard to an audio signal, so that a sound can be output through a sound output unit achieved by a loudspeaker or the like. The signal processor may include a hardware processor achieved by a chipset, a circuit, a buffer, etc. mounted onto a printed circuit board, or may be designed as a system on chip (SOC).

Meanwhile, the power supply may receive power from an external power source or an internal power source under control of the processor 50 and supply required power to the elements of the display apparatus 1.

Figure 3:
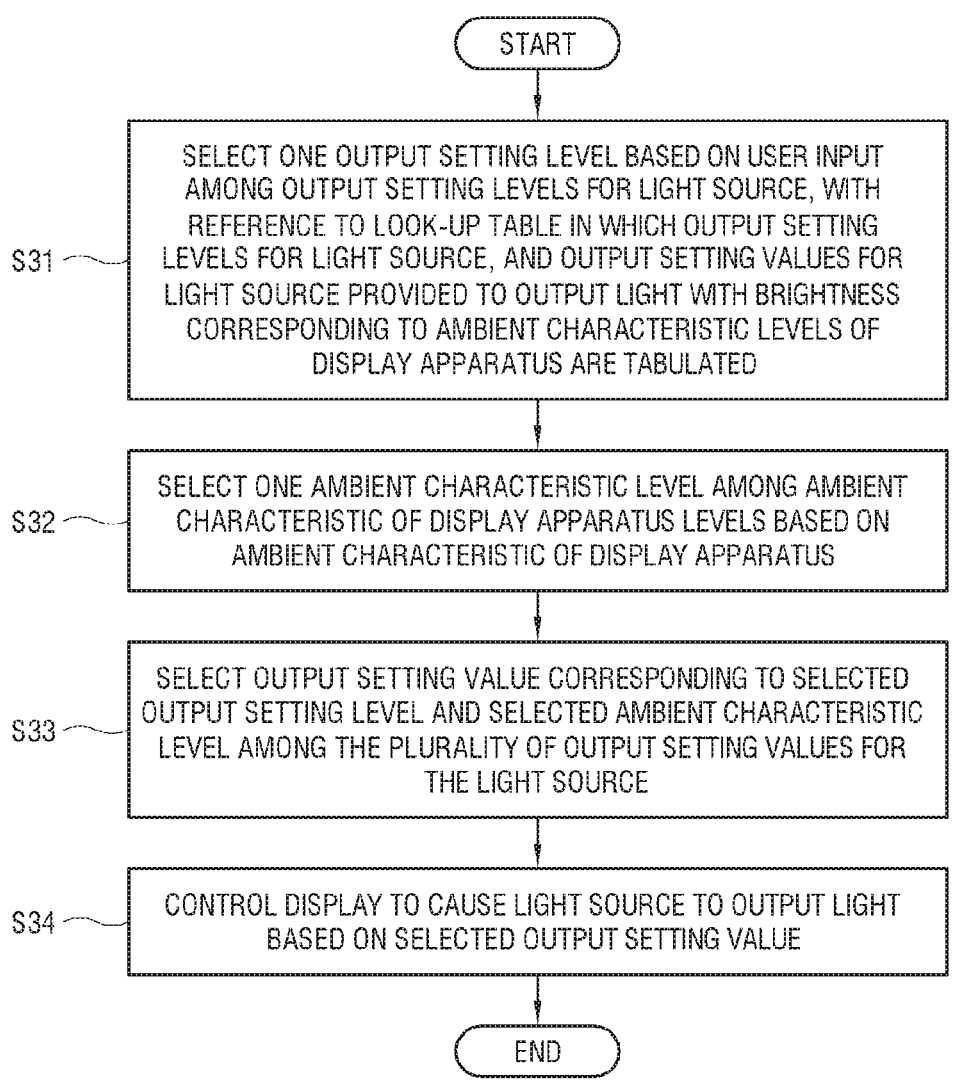
FIG. 3 is a flowchart of controlling the display apparatus in FIG. 1.

FIG. 3 is a flowchart showing a control method of the display apparatus in FIG. 1. In this embodiment, the control method may be carried out as the processor 50 of the display apparatus 1 executes the control program described above. Hereafter, for convenience of description, the operations of the processor 50 carried out by executing the control program may be simply regarded as the operations of the processor 50.

Referring to FIG. 3, the processor 50 may select one output setting level based on a user input among a plurality of output setting levels for the light source 11, with reference to the look-up table 21 in which the plurality of output setting levels for the light source 11 and a plurality of output setting values for the light source 11 prepared to output light with brightness corresponding to the plurality of ambient characteristic levels of the display apparatus 1 are tabulated (S31).

Further, the processor 50 may select one ambient characteristic level among the plurality of ambient characteristic levels of the display apparatus 1 based on the ambient characteristic of the display apparatus 1 (S32).

Further, the processor 50 may select an output setting value corresponding to the selected ambient characteristic level and the selected output setting level, among the plurality of output setting values for the light source 11 (S33).

Further, the processor 50 may control the light source 11 to emit light based on the selected output setting value (S34).

Like this, by the control method according to this embodiment, the processor 50 can display the image 16 with optimum brightness with reference to the look-up table 21, and thus a burden of processing in the processor 50 is eased, thereby not only preventing a time delay or performance degradation in adjustment into the optimum brightness but also reducing power consumption.

FIG. 4 illustrates a look-up table in which a plurality of output setting values in FIG. 3 are tabulated. In the look-up table 21, output setting levels (b), ambient characteristic levels (e), and output setting values (p) may be tabulated.

The output setting level (b) indicates a level for setting an output within an acceptable output range of the light source 11. For example, when the whole acceptable output range of the light source 11 is '10' to '90', the acceptable output range may be divided into 9 steps, and the output setting level (b) may also be divided into nine steps of the first output setting level b1 to the ninth output setting level b9. Further, the first to ninth output setting levels b1 to b9 may be provided corresponding to output levels '10' to '90', respectively. However, there are no limits to the output setting level (b). Alternatively, the output setting level (b) may be divided into various steps by considering the acceptable output range of the light source 11 according to design methods.

The ambient characteristic level (e) may indicate a predetermined step classified according to effective ranges of the ambient characteristic. For example, when the effective illuminance of the illumination 61 ranges from '0 lux' to '1000 lux', the effective illuminance may be divided into nine steps like '0-100 lux', '200-300 lux' . . . '800-900 lux', '900-1000 lux', and the ambient characteristic level (e) may also be divided into nine steps of the first ambient characteristic level e1 to the ninth ambient characteristic level e9. Further, the first to ninth ambient characteristic levels e1 to e9 may be provided corresponding to nine steps of illuminance ranges '0-100 lux', '200-300 lux' . . . '800-900 lux', '900-1000 lux', respectively. However, there are no limits to the ambient characteristic level (e). Alternatively, the ambient characteristic level (e) may be divided into various steps by considering the effective range of the ambient characteristic according to design methods.

The output setting value (p) refers to a setting value for controlling the light source 11 to emit light corresponding to combination of the output setting level (b) and the ambient characteristic level (e). For example, in the look-up table 21 shown in FIG. 4, the output setting values (p) may be a plurality of values such as '1', '2' . . . '88', and '90'. In this case, the light source 11 may be controlled to emit light suited for the output setting level (b) and the ambient characteristic level (e) according to the control setting values of '1', '2' . . . '88', '90'. However, there are no limits to such values. Alternatively, there may be provided the look-up table 21 in which various output setting values (p) according to the output setting level (b) and the ambient characteristic level (e).

Figure 5:
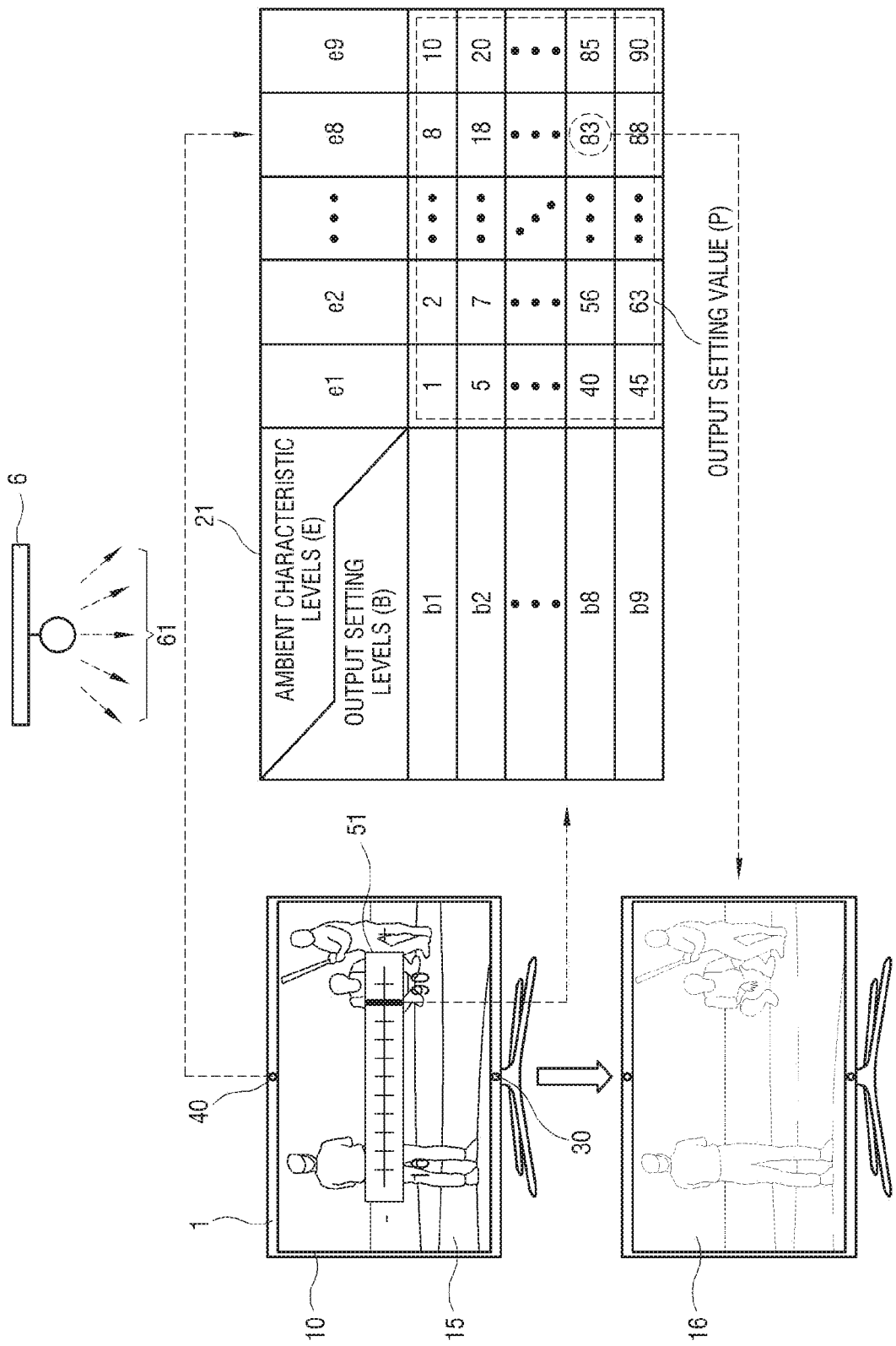
FIG. 5 illustrates that the display apparatus in FIG. 3 outputs light based on an output setting value selected in the look-up table.

FIG. 5 illustrates that the display apparatus in FIG. 3 outputs light based on an output setting value selected in the look-up table. As shown in FIG. 5, the processor 50 of the display apparatus 1 may display an output-setting-level adjustment user interface (UI) 51 through which a user input is made to adjust the output setting level of the light source 11. For example, the output-setting-level adjustment UI 51 may include the output setting levels of nine steps such as '10' to '90'. When a user input for the output setting level of '80' is made through the output-setting-level adjustment UI 51 while the image 15 is displayed having the output setting level of '40', the processor 50 may control the display 10 so that the light source 11 can output light having the output setting level of '80'.

Hereinafter, it will be described in detail that the processor 50 displays the image 16 changed in the output setting level of the light source 11 with reference to the look-up table 21, on the assumption that the user input for the output setting level of '80' is received through the output-setting-level adjustment UI 51 while the image 15 having the output setting level of '40' is displayed.

As shown in FIG. 5, the processor 50 may select the output setting level (b) corresponding to the output setting level of '80' among the plurality of output setting levels (b) in the look-up table 21, in response to the user input for the output setting level of '80' received through the output-setting-level adjustment UI 51.

The processor 50 may detect the ambient characteristic, and select the ambient characteristic level (e) based on the detected ambient characteristic among the plurality of ambient characteristic levels (e) in the look-up table 21. For example, the processor 50 may detect the illumination 61 having the illuminance of '850 lux', and select the eighth ambient characteristic level e8 matching the detected illuminance of '850 lux' among the plurality of ambient characteristic levels (e) in the look-up table 21.

Further, the processor 50 may select an output setting value (p) corresponding to the selected ambient characteristic level (e) and the selected output setting level (b) among the plurality of output setting values (p), and control the light source 11 to emit light based on the selected output setting value (p). For example, the processor 50 may select an output setting value of '83' matching the selected eighth output setting level b8 and the selected eighth ambient characteristic level e8 among the plurality of output setting values (p) in the look-up table 21, and control the light source 11 to emit light based on the selected output setting value of '83'.

Like this, the processor 50 in the display apparatus 1 according to this embodiment displays the image 16 with the optimum brightness with reference to the look-up table 21, and thus a burden of processing or the like in the processor 50 is eased, thereby not only preventing a time delay or performance degradation in adjusting the image 16 to have the optimum brightness but also reducing power consumption.

Figure 6:
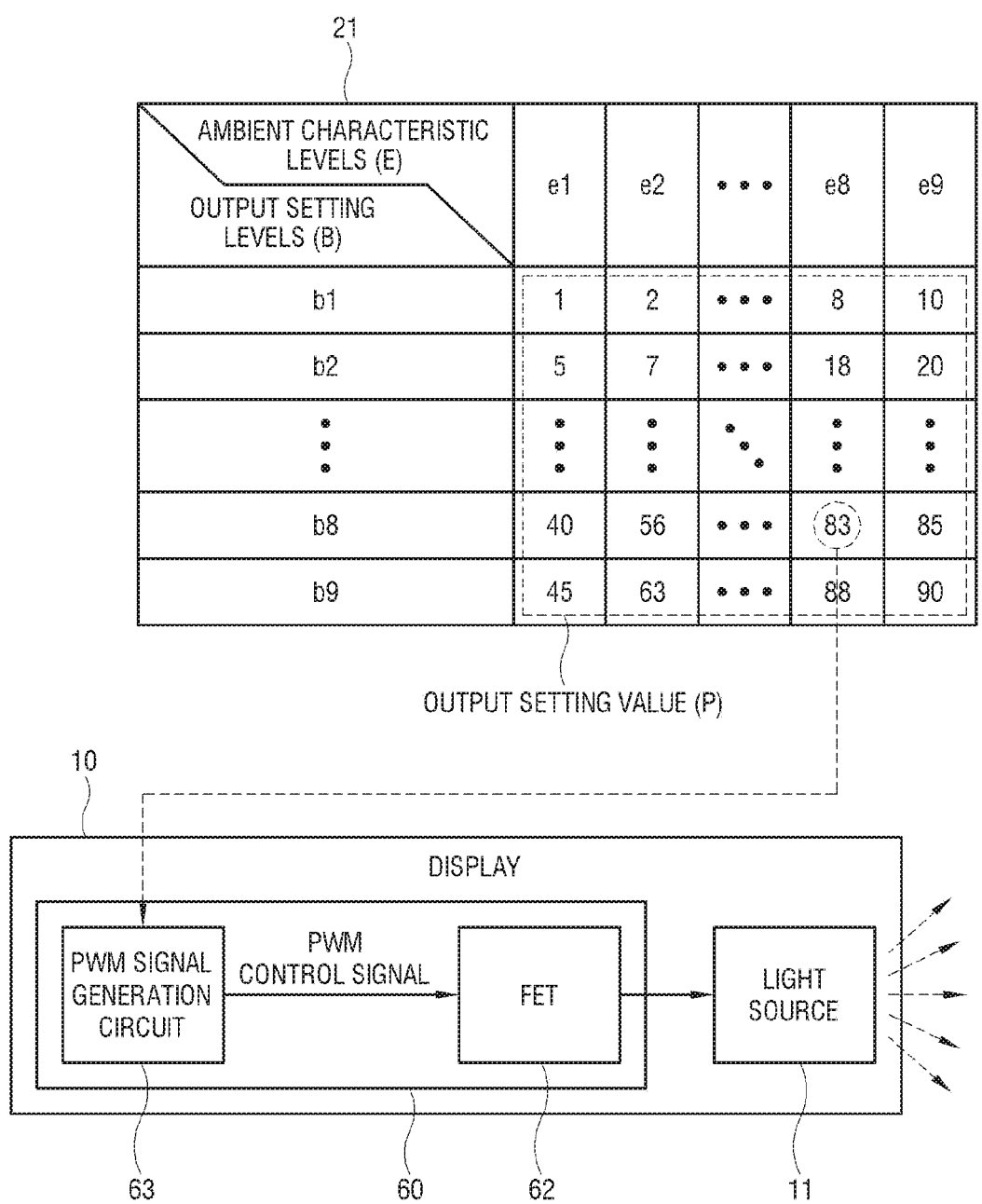
FIG. 6 illustrates that a light source is driven based on a pulse width modulation (PWM) control signal in connection with operation S35 in FIG. 3.

FIG. 6 illustrates that a light source is driven based on a pulse width modulation (PWM) control signal in connection with the operation S35 in FIG. 3. As shown in FIG. 6, the display 10 may include a driving circuit 60 configured to drive the light source 11 and the light source 11, and the driving circuit 60 may further include a PWM signal generation circuit 63 and a field effect transistor (FET) 62. A circuit related to the driving circuit 60 is a closed path that allows electricity to flow from one point to another. It may include various electrical components, such as transistors, resistors, and capacitors.

As described with reference to FIG. 5, the processor 50 identifies the output setting value (p) matching the selected output setting level (b) and the selected ambient characteristic level (e) among the plurality of output setting values (p), and transmits the identified output setting value (p) to the PWM signal generation circuit 63 to the driving circuit 60.

The PWM signal generation circuit 63 may generate a PWM control signal having a duty corresponding to the output setting value (p) based on the received output setting value (p), and output the PWM control signal to the FET 62. The FET 62 may be switched on and off based on the received PWM signal, and transmit a driving signal for driving the light source 11 to the light source 11.

FIG. 7 illustrates that a second output setting value of a second look-up table is selected based on an output setting value selected in the look-up table in connection with the operation S34 in FIG. 3. As shown in FIG. 7, the look-up table 21 and a second look-up table 22 may be provided.

As described with reference to FIGS. 4 and 5, the look-up table 21 may include the plurality of output setting levels (b) for the light source 11, and the plurality of output setting values (p) for the light source 11 prepared to output light with brightness corresponding to the plurality of ambient characteristic levels (e) of the display apparatus 1.

The second look-up table 22 may include a plurality of second output setting levels (c) based on the output setting value (p) of the look-up table 21, and a plurality of second output setting values (q) prepared for outputting images corresponding to the plurality of characteristic levels of the display apparatus 1. The plurality of characteristic levels (w) may include a plurality of second ambient characteristic levels or a plurality of user image-quality adjustment levels. Further, the second output setting value (q) in the second look-up table 22 may indicate the brightness setting value for the light source 11, or may indicate the brightness setting value of the image signal itself.

Below, it will be described in detail with reference to FIG. 7 that, when the plurality of characteristic levels (w) includes the plurality of second ambient characteristic levels, i.e. when the abscissa of the second look-up table 22 indicates the plurality of second ambient characteristic levels of the display apparatus 1 and the second output setting value (q) is the brightness setting value for the light source 11, a process of displaying the image 16 with brightness changed based on the look-up table 21 and the second look-up table 22 in response to a user input for changing the output setting level.

The second ambient characteristic level may correspond to the second ambient characteristic different from the ambient characteristic corresponding to the first ambient characteristic level (e). For example, when the ambient characteristic corresponding to the first ambient characteristic level (e) is the illuminance, the second ambient characteristic corresponding to the second ambient characteristic level may include a color temperature. When an effective color temperature range is '0-3000 kelvin', the whole color temperature range may be divided into nine steps such as '0-3000 kelvin', '3000-4000 kelvin' . . . '7000-8000 kelvin' and '8000-10000 kelvin'. Thus, the plurality of second ambient characteristic levels may also be divided into nine steps such as w1 to w9, which respectively correspond to '0-3000 kelvin', '3000-4000 kelvin' . . . '7000-8000 kelvin' and '8000-10000 kelvin'. However, the second ambient characteristic is not limited to the color temperature, and, as necessary, the second ambient characteristic may include white balance, contrast, etc. of the display apparatus 1.

The user input for changing the output setting level is not limited to the change of the output setting level for the light source 11. Alternatively, a user input may be made to change a brightness level of an image signal. However, for convenience of description, it will be described below that the user input is made to change the output setting level.

When a user input is made to change an output setting level into '80' while the image 15 displayed having the output setting level of '40', the processor 50 may select the output setting value (p) with reference to the look-up table 21.

In particular, the processor 50 according to this embodiment may select a certain second output setting level (c) among the plurality of second output setting levels (c) in the second look-up table 22 based on the selected output setting value (p). For example, on the assumption that each output setting level (b) among the plurality of output setting values (p) in the look-up table 21 is provided corresponding to the plurality of second output setting levels (c) in the second look-up table 22, when the output setting value (p) of '83' is selected in the look-up table 21, the second output setting level of 'c8' corresponding to the eighth output setting level b8 of the output setting value (p) of '83' may be selected among the plurality of second output setting levels (c).

Further, the processor 50 may select a certain second ambient characteristic level among the plurality of second ambient characteristic levels based on the detected second ambient characteristic. For example, when the color temperature of '8000-10000 kelvin' is detected, a second ambient characteristic level of 'w9' corresponding to '8000-10000 kelvin' may be selected among the plurality of second ambient characteristic levels.

Further, the processor 50 may select a second output setting value (q) corresponding to the selected second output setting level (c) and the selected second ambient characteristic level among the plurality of second output setting values (q), and control the display 10 to display the image 16 based on the selected second output setting value (q). For example, when 'c8' and 'w9' are selected, the processor 50 may select a second output setting value (q) of '79' matching 'c8' and 'w9' among the plurality of second output setting values (q) in the second look-up table 22. When the second output setting value (q) is the brightness setting value for the light source 11, the processor 50 may control the light source 11 to emit light based on '79'.

Below, it will be described in detail with reference to FIG. 7 that, when the plurality of characteristic levels (w) includes the plurality of user image-quality adjustment levels, i.e. when the abscissa of the second look-up table 22 indicates the plurality of user image-quality adjustment levels of the display apparatus 1 and the second output setting value (q) is the brightness setting value for the image signal, a process of displaying the image 16 with brightness changed based on the look-up table 21 and the second look-up table 22 in response to a user input for changing the output setting level.

The user image-quality adjustment level may indicate predetermined steps classified according to effect ranges of image-quality adjustment factors such as the brightness, contrast, chroma, light and shade, hue, etc. For example, when the effective brightness of the display 10 has a range of '0-90', '0-10', the range is divided into brightness sections of nine steps such as '10-200' . . . '70-80' and '80-90', and the user image-quality adjustment level is divided into nine steps of first to ninth user image-quality adjustment levels so as to respectively correspond to the brightness sections of nine steps such as '0-10', '10-20' . . . '70-80' and '80-90'.

When a user input is made to change the output setting level into '80' while the image 15 is displayed having the output setting level of '40', the processor 50 may select the output setting value (p) of '83' corresponding to the eighth ambient characteristic level c8 and the eighth output setting level b8 corresponding to the output setting level of '80' among the plurality of output setting values (p) in the look-up table 21, and may select 'c8' corresponding to the eighth output setting level b8 of the output setting value (p) of '83' among the plurality of second output setting levels (c) in the second look-up table 22.

In particular, the processor 50 according to this embodiment may select a certain image-quality adjustment level among the plurality of user image-quality adjustment levels. For example, the processor 50 may display a brightness-level adjustment UI of the display 10, select the corresponding brightness section of '80-90' based on a user input made through the brightness-level adjustment UI, and select a ninth user image-quality adjustment level of 'w9' matching the selected brightness section of '80-90'.

Further, the processor 50 may select the second output setting value (q) corresponding to the selected user image-quality adjustment level of 'w9' and the selected second output setting level (c) among the second output setting values (q), and control the image 16 to be displayed with brightness changed based on the selected second output setting value (q). For example, the processor 50 may select the second output setting value (q) of '79' corresponding to 'c8' and the ninth user image-quality adjustment level of 'w9' among the plurality of second output setting values (q) in the second look-up table 22. When the second output setting value (q) is the brightness setting value for the image signal, the processor 50 may change the brightness level of the image signal into '79', thereby adjusting the brightness of the image 16.

Thus, the display apparatus 1 according to this embodiment controls the display 10 to display the image 16 with the optimum brightness with reference to the look-up table 21 and the second look-up table 22 in response to a user input, thereby providing optimum viewing environments corresponding to various and complicated ambient characteristics.

Meanwhile, the processor 50 may control the display 10 to display the image 16 with the brightness changed with independent reference to the second look-up table 22. When the second look-up table 22 is independently referenced, the second output setting level (c) in the second look-up table 22 may indicate a level for setting the output within the acceptable output range of the display 10.

Figure 8:
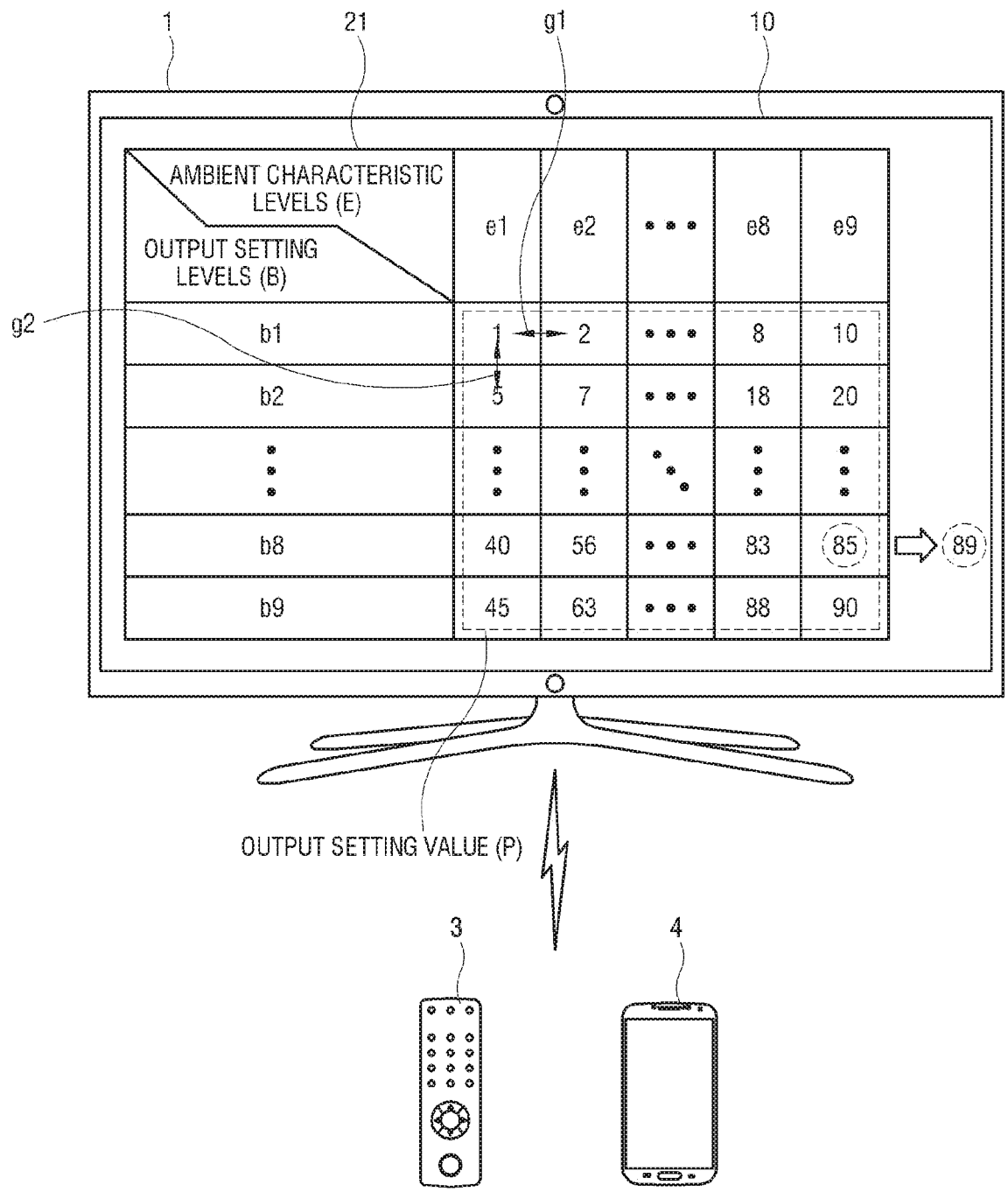
FIG. 8 illustrates that at least one output setting value is changed among a plurality of output setting values in the look-up table.

FIG. 8 illustrates that at least one output setting value is changed among a plurality of output setting values in the look-up table. As shown in FIG. 8, the processor 50 of the display apparatus 1 may display a UI showing the look-up table 21 in which the plurality of output setting values (p) are tabulated, and change at least one output setting value (p) among the plurality of output setting values (p) in response to a user input made through the UI.

For example, the processor 50 may select an output setting value of '85' matching an eighth output setting level b8 and a ninth ambient characteristic level e9 among the plurality of output setting values (p) in the look-up table 21 in response to a user input made to the remote controller 3, and change the selected '85' into '89'. However, the user input is not limited to that made to the remote controller 3. Alternatively, the output setting value (p) may be changed in response to a user input made to a smartphone 4 or the like external apparatus. When the output setting value (p) is changed through the smartphone 4, the smartphone 4 executes an application for changing the output setting value (p) and the change of the output setting value (p) is carried out through the UI based on the executed application.

Meanwhile, the plurality of output setting levels (b) and the plurality of ambient characteristic levels (e) may be provided to uniform a gap between the plurality of neighboring output setting values (p), or may be modified based on a user input. For example, the first output setting level b1, the second output setting level b2, the first ambient characteristic level e1, and the second ambient characteristic level e2 may be provided so that a gap g1 between an output setting value of '1' and an output setting value of '2' can be equal to a gap g2 between the output setting value of '1' and an output setting value of '5'. Further, a user input may change the gap g1 between the output setting value of '1' and the output setting value of '2' and the gap g2 between the output setting value of '1' and the output setting value of '5' to be equal to each other. However, there are no limits to this embodiment. Alternatively, the levels of at least some sections among the plurality of output setting levels (b) and the plurality of ambient characteristic levels (e) may be provided to have non-uniform gaps between the plurality of neighboring output setting values (p), or may be changed by a user input.

Meanwhile, when the output setting value (p) in the look-up table 21 is changed by a user input, the processor 50 may control the storage 20 to store the look-up table 21 in which the changed output setting value (p) is tabulated.

Figure 9:
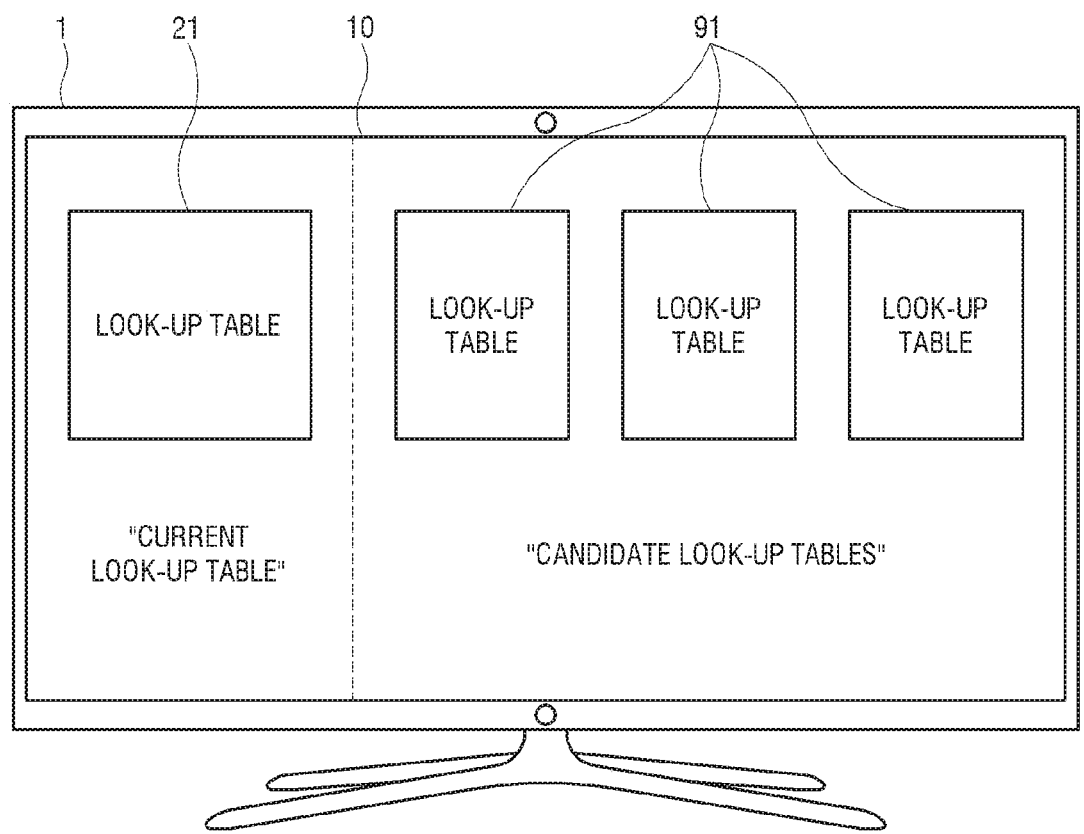
FIG. 9 illustrates an example of selecting a plurality of look-up tables different in an output setting value from one another.

Like this, the display apparatus 1 according to this embodiment changes the look-up table 21 in response to a user input, thereby providing more accurately optimized viewing environments FIG. 9 illustrates an example of selecting a plurality of look-up tables different in an output setting value from one another. As shown in FIG. 9, the processor 50 of the display apparatus 1 displays a UI showing a plurality of look-up tables, and select one among the plurality of look-up tables in response to a user input made through the displayed UI. The processor 50 may employ the selected look-up table based on the user input made through the UI.

Specifically, the processor 50 may display a UI showing the current look-up table 21 and the plurality of candidate look-up tables 91. As necessary, the UI may distinguishably show the current look-up table 21 and the plurality of candidate look-up tables 91.

The current look-up table 21 and the plurality of candidate look-up tables 91 may be different in the output setting value (p) from one another with respect to one output setting level (b) and one ambient characteristic level (e). In other words, at least one corresponding output setting values (p) among the output setting values (p) may be different between the current look-up table 21 and the candidate look-up tables 91.

When the candidate look-up table 91 is selected in response to a user input, the processor 50 may control the brightness of the image 16 with reference to the selected candidate look-up table 91. For example, when a user input is made to change the output setting level, the processor 50 may select the output setting value (p) based on the ambient characteristic level (e) corresponding to the ambient characteristic and the output setting level (b) corresponding to the user input among the plurality of output setting values (p) in the candidate look-up table 91, and control the display 10 so that the light source 11 can emit light at the output setting level based on the selected output setting value (p).

Meanwhile, when the candidate look-up table 91 is selected, the processor 50 may store the selected candidate look-up table 91 in the storage 20.

Like this, the display apparatus 1 according to this embodiment selects one among the plurality of look-up tables, which are different in the output setting value (p) with respect to one output setting level (b) and one ambient characteristic level (e), in response to a user input, thereby not only enhancing convenience for a user but also providing more accurately optimized viewing environments.

Figure 10:
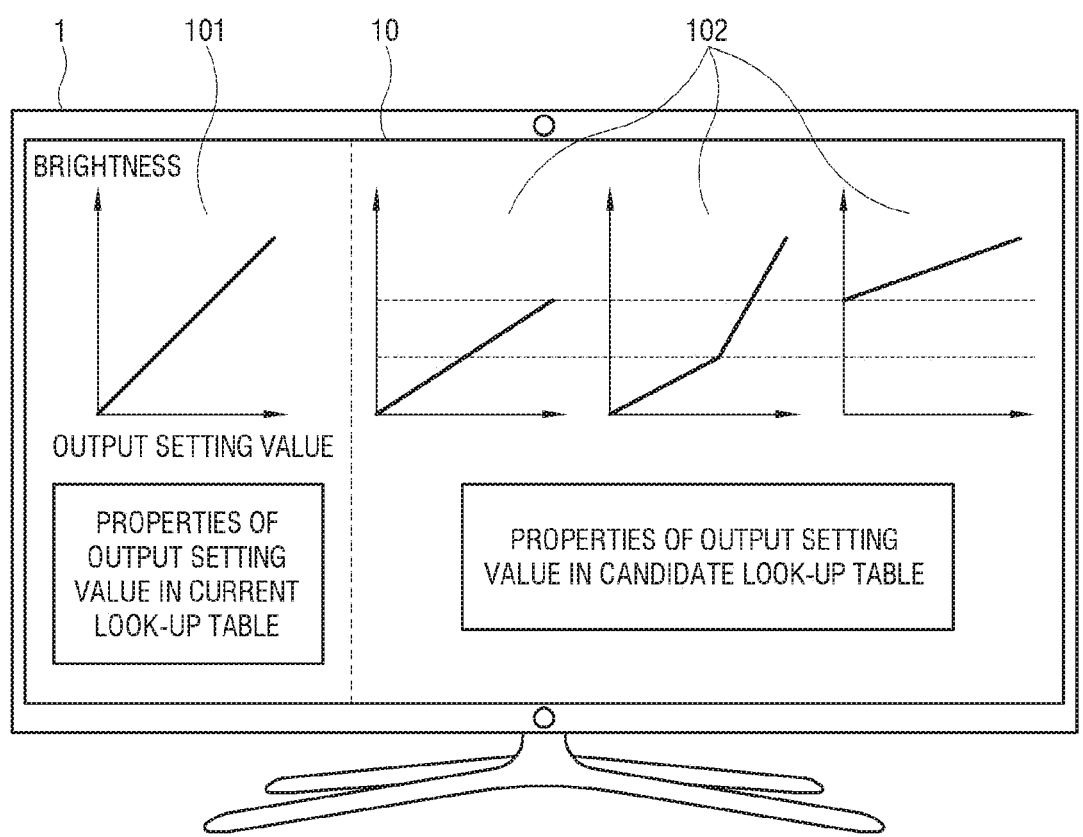
FIG. 10 illustrates an example of displaying guide information that shows properties of output setting values in the plurality of look-up tables.

FIG. 10 illustrates an example of displaying guide information that shows properties of output setting values in the plurality of look-up tables. As shown in FIG. 10, the processor 50 of the display apparatus 1 may display a UI with guide information that shows the properties of the output setting values in the plurality of look-up tables.

Specifically, the guide information may include a graph 101 showing the properties of the output setting value (p) in the current look-up table 21, and candidate graphs 102 showing the properties of the output setting values (p) in the plurality of candidate look-up tables. As described with reference to FIG. 9, the current look-up table 21 and the plurality of candidate look-up tables 91 may be different in the output setting value (p) from one another with respect to one output setting level (b) and one ambient characteristic level (e). Therefore, the graph 101 showing the properties of the output setting value in the current look-up table 21 may be different in brightness properties from the candidate graph 102 with respect to one output setting level (b) and one ambient characteristic level (e)

When a certain candidate graph 102 is selected among the plurality of candidate graphs 102 in response to a user input made through a UI, and another user input is made to change the output setting level through the output-setting-level adjustment UI, the processor 50 may control the display 10 so that the light source 11 can emit light at the output setting level based on the output setting value (p) selected with reference to the look-up table of the selected candidate graph 102.

Thus, the display apparatus 1 according to this embodiment displays the UI with the guide information showing the properties of the output setting values in the plurality of look-up tables, thereby not only enhancing convenience for a user but also providing more accurately optimized viewing environments.

Figure 11:
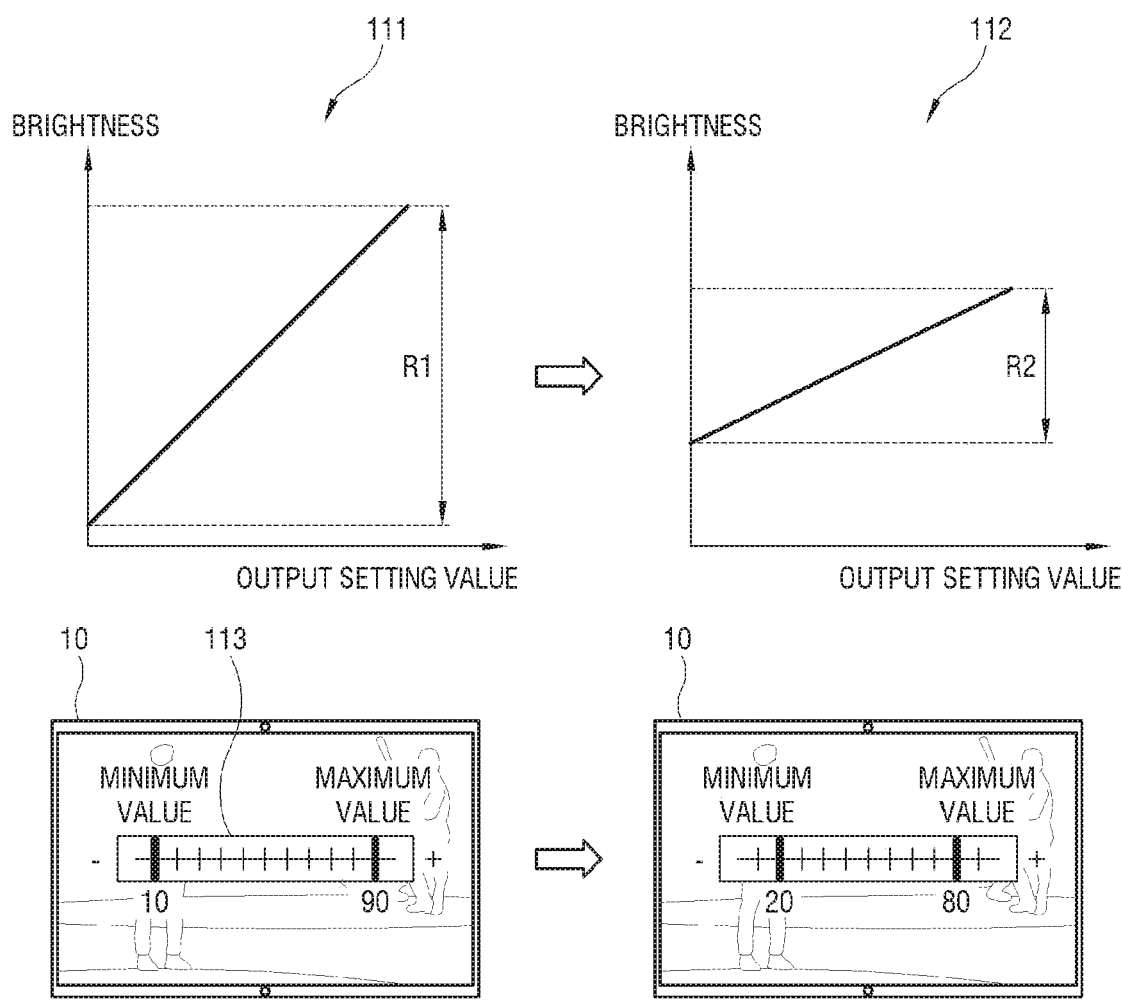
FIG. 11 shows properties of output setting values changed based on the minimum value or maximum value of the output setting level.

FIG. 11 shows properties of output setting values changed based on the minimum value or maximum value of the output setting level. In the display apparatus 1 according to this embodiment, the processor 50 may adjust at least one of the minimum value or the maximum value of the plurality of output setting levels (b) in response to a user input. For example, the processor 50 may display a UI with the look-up table 21 in which the plurality of output setting levels (b), the plurality of ambient characteristic levels (e), and the plurality of output setting values (p) are tabulated, and adjust at least one of the minimum value or the maximum value of the plurality of output setting levels (b) in response to a user input made through the UI. Alternatively, as shown in FIG. 11, the processor 50 may display a UI 113 for adjusting the minimum value or the maximum value of the plurality of output setting levels (b), and change the minimum value or the maximum value of the plurality of output setting levels (b) in response to a user input made through the UI 113.

The processor 50 may display the image 16 with brightness based on the plurality of changed output setting values (p). For example, as shown in FIG. 11, the processor 50 may control the light source 11 to show the properties of the output setting value (p) like a first graph 111. The properties of the output setting value (p) as shown in the first graph 111 may have a first brightness range R1 of the light source 11.

When the minimum value or the maximum value of the output setting level (b) is changed to show the properties of the output setting value (p) like a second graph 112, the processor 50 may control the light source 11 to emit light within a second brightness range R2 as shown in the second graph 112.

Meanwhile, the processor 50 may change and display the step and range of the output-setting-level adjustment UI in accordance with the brightness ranges. For example, when the first brightness range R1 corresponding to the first graph 111 is '10' to '90', the output-setting-level adjustment UI corresponding to the first graph 111 may have the output setting levels of nine steps from '10' to '90'. Therefore, a user may select a desired output setting level within the range of the output setting levels of nine steps through the output-setting-level adjustment UI. On the other hand, when the second brightness range R2 corresponding to the second graph 112 is '20' to '80', the output-setting-level adjustment UI corresponding to the second graph 112 may have the output setting levels of seven steps from '20' to '80'. Therefore, a user may select a desired output setting level within the range of the output setting levels of seven steps through the output-setting-level adjustment UI.

FIG. 12 illustrates an example of displaying second guide information that shows properties of output setting values of the plurality of look-up tables different in the minimum value or maximum value of the output setting level from each other. As shown in FIG. 12, the processor 50 of the display apparatus 1 according to this embodiment may display second guide information showing a graph 121 and a plurality of candidate graphs 122. The graph 121 and the plurality of candidate graphs 122 may show the properties of the output setting value in the plurality of look-up tables which are different in the minimum value or the maximum value of the output setting level from one another.

Specifically, the graph 121 may show that the light source 11 emits light with the first brightness range R1 based on the properties of the output setting value (p) in the current look-up table 21, and the plurality of candidate graph 122 may show that the light source 11 emits light with the second brightness range R2 and a third brightness range R3 based on the properties of the output setting values (p) in the plurality of candidate look-up tables.

Further, when one among the plurality of candidate graph 122 is selected based on a user input made through the second guide information, the processor 50 may control the light source 11 to emit light within the second brightness range R2 and the third brightness range R3 based on the output setting value (p) in the look-up table of the selected candidate graph 122.

Thus, the display apparatus 1 according to this embodiment displays the second guide information showing the properties of the output setting values in the plurality of look-up tables which are different in the minimum value or the maximum value of the output setting level from each other, thereby not only enhancing convenience for a user but also providing more accurately optimized viewing environments.

According to the disclosure, there are provided a display apparatus and a control method thereof, in which a burden of resources is eased when the brightness of an image is adjusted considering an ambient characteristic, thereby not only preventing a delay of a brightness adjusting time and degradation of brightness adjusting performance, but also reducing power consumption.

Although a few embodiments of the disclosure have been described in detail, the disclosure is not limited to these embodiments but variously embodied within the appended claims.

What is claimed is:

1. A display apparatus comprising:
a display comprising a light source configured to emit light, wherein the display is configured to display an image based on the emitted light;
a storage configured to store a first look-up table, wherein the first look-up table is configured to comprise a plurality of first output setting levels, a plurality of first ambient characteristic levels and a plurality of first output setting values predefined and corresponding to an operation between the plurality of first output setting levels and the plurality of first ambient characteristic levels, respectively;
an input receiving circuit configured to receive a first user input;
a sensor configured to detect a first ambient characteristic of the display apparatus; and
a processor configured to:
select a first output setting value among the plurality of first output setting values without performing the operation, the first output setting value corresponding to a first output setting level among the plurality of first output setting levels and a first ambient characteristic level among the plurality of first ambient characteristic levels, and the first output setting level being based on the received first user input and the first ambient characteristic level being based on the detected first ambient characteristic, and
control the display to control the light source to emit light based on the selected first output setting value.

2. The display apparatus according to claim 1, wherein the detected first ambient characteristic comprises at least one of brightness or color temperature around the display apparatus.

3. The display apparatus according to claim 1, wherein
the display further comprises a driving circuit configured to drive the light source based on a pulse width modulation (PWM) control signal, and
the first output setting value comprises a setting value of the PWM control signal.

4. The display apparatus according to claim 1, wherein
the sensor is further configured to detect a second ambient characteristic of the display apparatus,
the storage is further configured to store a second look-up table, wherein the second look-up table is configured to store a plurality of second output setting values corresponding to a plurality of second output setting levels and a plurality of second ambient characteristic levels of the display apparatus, respectively, and
the processor is further configured to:
select a second output setting level among the plurality of second output setting levels stored in the second look-up table, based on the selected first output setting value,
select a second ambient characteristic level among the plurality of second ambient characteristic levels stored in the second look-up table, based on the detected second ambient characteristic,
select a second output setting value corresponding to the selected second output setting level and the selected second ambient characteristic level among the plurality of second output setting values stored in the second look-up table, and
control the display to display the image based on the selected second output setting value.

5. The display apparatus according to claim 1, wherein
the input receiving circuit is further configured to receive a second user input;
the storage is further configured to store a second look-up table, wherein the second look-up table is configured to store a plurality of second output setting values corresponding to a plurality of second output setting levels and a plurality of image-quality adjustment levels of the display apparatus, respectively, and
the processor is further configured to:
select a second output setting level among the plurality of second output setting levels stored in the second look-up table, based on the selected first output setting value,
select an image-quality adjustment level among the plurality of image-quality adjustment levels stored in the second look-up table, based on the received second user input,
select a second output setting value corresponding to the selected second output setting level and the selected image-quality adjustment level among the plurality of second output setting values stored in the second look-up table, and
control the display to display the image based on the selected second output setting value.

6. The display apparatus according to claim 4, wherein the second output setting value comprises one of a brightness setting value for the light source or a brightness setting value for an image signal.

7. The display apparatus according to claim 1, wherein
the storage is further configured to store a plurality of look-up tables having different output setting values from each other with respect to a same output setting level and a same ambient characteristic level,
the processor is further configured to select a look-up table among the plurality of look-up tables, and select the output setting value in the selected look-up table.

8. The display apparatus according to claim 7, wherein the processor is further configured to select the look-up table among the plurality of look-up tables based on the received first user input.

9. The display apparatus according to claim 7, wherein the processor is further configured to control the display to display guide information showing properties of the output setting values in the plurality of look-up tables.

10. The display apparatus according to claim 7, wherein the plurality of output setting levels and the plurality of ambient characteristic levels are provided to have uniform gaps between neighboring output setting values.

11. The display apparatus according to claim 7, wherein levels of at least some sections of the plurality of output setting levels and the plurality of ambient characteristic levels are provided to have non-uniform gaps between neighboring output setting values.

12. The display apparatus according to claim 7, wherein the processor is further configured to change at least one first output setting value among the plurality of first output setting values in the first look-up table based on the received first user input, and store the changed at least one first output setting value in the storage.

13. The display apparatus according to claim 12, wherein the processor is further configured to adjust at least one of a minimum value or a maximum value of the first output setting level based on the received first user input, and change the plurality of first output setting values based on adjusted at least one of the minimum value or the maximum value of the first output setting level.

14. The display apparatus according to claim 13, wherein the processor is further configured to control the display to display guide information showing properties of first output setting values in the plurality of look-up tables which are different in the minimum value or the maximum value of the first output setting level from each other.

15. A method of controlling, by at least one processor, a display apparatus comprising a display comprising a light source configured to emit light, wherein the display is configured to display an image based on the emitted light, the method comprising:
providing a first look-up table configured to comprise a plurality of first output setting levels, plurality of first ambient characteristic levels and a plurality of first output setting values predefined and corresponding to an operation between the plurality of first output setting levels and the plurality of first ambient characteristic levels, respectively;
selecting a first output setting value among the plurality of first output setting values without performing the operation, the first output setting value corresponding to a first output setting level among the plurality of first output setting levels and a first ambient characteristic level among the plurality of first ambient characteristic levels, and the first output setting level being based on the received first user input and the first ambient characteristic level being based on the detected first ambient characteristic; and
controlling the display to control the light source to emit light based on the selected first output setting value.

16. The method according to claim 15, wherein the first ambient characteristic comprises at least one of brightness or color temperature around the display apparatus.

17. The method according to claim 15, wherein
the output setting value comprises a setting value for a pulse width modulation (PWM) control signal, and
the controlling comprises driving the light source based on the PWM control signal.

18. The method according to claim 15, further comprising:
selecting, from a second look-up table configured to store a plurality of second output setting values corresponding to a plurality of second output setting levels and a plurality of second ambient characteristic levels of the display apparatus, respectively, a second output setting level among the plurality of second output setting levels stored in the second look-up table, based on the selected first output setting value;
selecting a second ambient characteristic level among the plurality of second ambient characteristic levels stored in the second look-up table, based on a second ambient characteristic of the display apparatus;
selecting a second output setting value corresponding to the selected second output setting level and the selected second ambient characteristic level among the plurality of second output setting values stored in the second look-up table; and
controlling the display to display the image based on the selected second output setting value.

19. The method according to claim 15, further comprising:
selecting, from a second look-up table configured to store a plurality of second output setting values corresponding to a plurality of second output setting levels and a plurality of image-quality adjustment levels of the display apparatus, respectively, a second output setting level among the plurality of second output setting levels stored in the second look-up table, based on the selected first output setting value;
selecting an image-quality adjustment level among the plurality of image-quality adjustment levels stored in the second look-up table, based on a second user input;
selecting a second output setting value corresponding to the selected second output setting level and the selected image-quality adjustment level among the plurality of second output setting values stored in the second look-up table; and
controlling the display to display the image based on the selected second output setting value.

20. A non-transitory recording medium storing a computer program comprising a computer-readable code for performing a method of controlling, by at least one processor, a display apparatus comprising a display comprising a light source configured to emit light, wherein the display is configured to display an image based on the emitted light, the method comprising:
providing a first look-up table configured to comprise a plurality of first output setting levels, plurality of first ambient characteristic levels and a plurality of first output setting values predefined and corresponding to an operation between the plurality of first output setting levels and the plurality of first ambient characteristic levels, respectively;

selecting a first output setting value among the plurality of first output setting values without performing the operation, the first output setting value corresponding to a first output setting level among the plurality of first output setting levels and a first ambient characteristic level among the plurality of first ambient characteristic levels, and the first output setting level being based on the received first user input and the first ambient characteristic level being based on the detected first ambient characteristic; and controlling the display to control the light source to emit light based on the selected first output setting value.

* * * * *